US012652189B2

(12) United States Patent
Moeneclaey et al.

(10) Patent No.: US 12,652,189 B2
(45) Date of Patent: Jun. 9, 2026

(54) RECEIVER DEVICE FOR TWO-WIRE BUS

(71) Applicant: STMicroelectronics International N.V., Geneva (CH)

(72) Inventors: Nicolas Moeneclaey, Vourey (FR); Gilles Troussel, Grenoble (FR); Christophe Tourniol, Le Gua (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/762,760

(22) Filed: Jul. 3, 2024

(65) Prior Publication Data

US 2025/0030577 A1     Jan. 23, 2025

(30) Foreign Application Priority Data

Jul. 18, 2023     (FR) ....................................... 2307671

(51) Int. Cl.
*H04L 25/00*          (2006.01)
*H02M 7/219*          (2006.01)
*H04L 12/40*          (2006.01)

(52) U.S. Cl.
CPC ...... *H04L 12/40045* (2013.01); *H02M 7/219* (2013.01)

(58) Field of Classification Search
CPC ....... H04L 25/085; H04L 12/10; H04B 3/542; H04B 3/06; H04B 2203/5466; H04B 2203/547; H04W 24/08; G06F 13/4068; G06F 1/28

USPC ......................................................... 375/257
See application file for complete search history.

(56) References Cited

U.S. PATENT DOCUMENTS

| | | |
|---|---|---|
| 6,326,817 B1 | 12/2001 | Boezen et al. |
| 2006/0226922 A1* | 10/2006 | Rajagopal .............. H03K 3/011<br>331/143 |
| 2016/0099821 A1* | 4/2016 | Streit ....................... H04B 3/06<br>375/257 |
| 2023/0291366 A1* | 9/2023 | Michal .................... H03F 3/082 |

FOREIGN PATENT DOCUMENTS

EP          1677461 A1     7/2006

* cited by examiner

*Primary Examiner* — Khai Tran
(74) *Attorney, Agent, or Firm* — Slater Matsil, LLP

(57)          ABSTRACT

A device includes first and second terminals configured to be respectively connected to first and second conductors of a differential two-wire bus. First and second identical resistive dividing bridges are connected between a reference node and respectively first and second nodes. Third and fourth identical resistive dividing bridges are connected between a supply node and respectively the first and second nodes. A reading circuit is configured to determine a binary state of the bus from the currents flowing through transistors of the reading circuit.

20 Claims, 3 Drawing Sheets

RECEIVER DEVICE FOR TWO-WIRE BUS

CROSS-REFERENCE TO RELATED APPLICATIONS

This application claims the benefit of French Patent Application No. 2307671, filed on Jul. 18, 2023, which application is hereby incorporated herein by reference.

TECHNICAL FIELD

The present disclosure generally concerns electronic circuits, for example, a receiver device or a two-wire bus.

BACKGROUND

Many differential two-wire buses are known. In these known buses, the digital data, or bits, transmitted over the bus are represented by the differential voltage between the two conductors of the two-wire bus. An example of such a known differential two-wire bus is the CAN bus.

Data transmission and/or reception devices are connected to the two conductors of the differential two-wire bus.

In particular, when such a device is configured to read digital data from the bus, this device comprises a circuit, or device, configured to read from the bus, which is connected to the two bus conductors.

In such differential two-wire buses, the common-mode potential of the bus may vary, for example, in the case of electrostatic discharges (ESD), for example, between –40 V and +40 V.

These variations of the common-mode potential of the bus may make known circuits for reading from the bus of data transmission and/or reception devices connected to the bus inoperative.

SUMMARY

The present disclosure generally concerns electronic circuits, for example, integrated electronic circuit. Particular examples relate to reception electronic circuits or devices for a differential two-wire bus, for example, of CAN (Controller Area Network) type.

Embodiments provide a device for reading from a differential two-wire bus which overcomes all or part of the disadvantages of known devices for reading from a differential two-wire bus, for example, of CAN type.

For example, there is a need for a device for reading from a differential two-wire bus, for example, of CAN type, which is robust to variations of the common-mode potential of the bus.

For example, there is a need for a device for reading from a differential two-wire bus, for example, of CAN type, which is robust to increases in the common-mode potential of the bus.

An embodiment overcomes all or part of the disadvantages of known devices for reading from a differential two-wire bus, for example, of CAN type.

An embodiment provides a device that comprises first and second terminals intended to be respectively connected to first and second conductors of a differential two-wire bus. First and second identical resistive divide bridges connected between a reference node and, respectively, first and second nodes respectively coupled with the first and second terminals. Third and fourth identical resistive divide bridges connected between a supply node and, respectively, the first and second nodes. A reading circuit comprises first and second NMOS transistors having their gates connected to each other and their sources connected to an intermediary node of the second bridge, third and fourth NMOS transistors having their gates connected to each other and their sources connected to a corresponding intermediary node of the first bridge, fifth and sixth PMOS transistors having their gates connected to each other and their sources connected to an intermediary node of the fourth bridge, and seventh and eighth PMOS transistors having their gates connected to each other and their sources connected to a corresponding intermediary node of the third bridge. The second and third transistors have their drains connected to a first current source. The sixth and seventh transistors have their drains connected to a second current source. The reading circuit is configured to determine a binary state of the bus from the currents flowing through the first, fourth, fifth, and eighth transistors.

According to an embodiment, the reference node is configured to receive a reference potential and the supply node is configured to receive a supply potential, preferably positive with respect to the reference potential.

According to an embodiment, each of the first and second bridges comprises a first resistive element connected between the reference node and the intermediary node of the bridge and a second resistive element connected between the intermediary node of the bridge and, respectively, the first node and the second node. Each of the third and fourth bridges comprises a third resistive element connected between the supply node and the intermediary node of the bridge and a fourth resistive element connected between the intermediary node of the bridge and, respectively, the first node and the second node.

According to an embodiment, a ratio of the resistance value of the first resistive element to the resistance value of the second resistive element is equal to a ratio of the resistance value of the third resistive element to the resistance value of the fourth resistive element.

According to an embodiment, in each of the first and second bridges, the first and second resistive elements are configured so that an AC voltage on the intermediary node of the first bridge corresponds to an AC voltage on the first terminal divided by a factor A, and an AC voltage on the intermediary node of the second bridge corresponds to an AC voltage on the second terminal divided by the factor A. In each of the third and fourth bridges, the third and fourth resistive elements are configured so that an AC voltage on the intermediary node of the third bridge corresponds to an AC voltage on the first terminal divided by the factor A, and an AC voltage on the intermediary node of the fourth bridge corresponds to an AC voltage on the second terminal divided by the factor A.

According to an embodiment, in each of the first and second bridges, the resistance value of the first resistive element is lower than the resistance value of the second resistive element and, in each of the third and fourth bridges, the resistance value of the third resistive element is lower than the resistance value of the fourth resistive element.

According to an embodiment, a fifth resistive element couples the first node with the first terminal and a sixth resistive element identical to the fifth one couples the second node with the second terminal.

According to an embodiment, the reading circuit comprises a first biasing circuit configured to apply a first biasing potential to the gates of the first and second transistors and a second biasing potential to the gates of the third and fourth transistors. The second potential is different from the first potential. A second biasing circuit is configured to apply a third biasing potential to the gates of the fifth and sixth transistors and a fourth biasing potential to the gates of the seventh and eighth transistors. The fourth potential is different from the third potential.

According to an embodiment, the first biasing circuit comprises the first current source, a seventh resistive element connected between the drain and the gate of the second transistor, an eighth resistive element that has the same resistance value as the seventh resistive element connected between the drain and the gate of the third transistor, and a third current source connected to the gates of the third and fourth transistors. The second biasing circuit comprises the second current source, a ninth resistive element connected between the drain and gate of the sixth transistor, a tenth resistive element that has the same resistance value as the ninth one connected between the drain and gate of the seventh transistor, and a fourth current source connected to the gates of the seventh and eighth transistors.

According to an embodiment, the reading circuit comprises a first circuit for copying current configured to draw, at a node for summing the current of the reading circuit, an image of a current through the first transistor. A second circuit is for copying current configured to deliver, at the node for summing the current, an image of a current through the fourth transistor. A third circuit for copying current is configured to deliver, at the node for summing the current, an image of a current through the fifth transistor. A fourth circuit is for copying current configured to draw, at the node for summing the current, an image of a current through the eighth transistor.

According to an embodiment, the first circuit for copying current comprises a first current mirror with PMOS transistors and a second current mirror with NMOS transistors. The first current mirror couples the drain of the first transistor with the second current mirror and the second current mirror couples the first current mirror with the node for summing. The second circuit for copying current comprises a third current mirror with PMOS transistors coupling the drain of the fourth transistor with the node for summing. The third circuit for copying current comprises a fourth current mirror with NMOS transistors and a fifth current mirror with PMOS transistors. The fourth current mirror couples the drain of the fifth transistor with the fifth current mirror and the fifth current mirror couples the fourth current mirror with the node for summing. The fourth circuit for copying current comprises a sixth current mirror with NMOS transistors coupling the drain of the eighth transistor with the node for summing.

According to an embodiment, the reading circuit comprises a transimpedance amplifier configured to receive a current determined by the currents flowing through the first, fourth, fifth, and eighth transistors and to deliver, from the received current, a binary voltage representative of a differential voltage of the bus.

According to an embodiment, the reading circuit comprises a transimpedance amplifier having an input coupled with, preferably connected to, the node for summing and an output configured to deliver, from a current received at its input, a binary voltage representative of a differential voltage of the bus.

According to an embodiment, the transimpedance amplifier comprises an inverter and a resistive element connected between an input of the inverter and an output of the inverter.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred, unless specified otherwise, to the orientation of the drawings.

Unless specified otherwise, the expressions "about," "approximately," "substantially," and "in the order of" signify plus or minus 10%, preferably of plus or minus 5%.

In the following description, the expression "resistive element" designates an element having two terminals between which the resistive element behaves as a resistor and thus exhibits a resistance value. A resistive element corresponds, for example, to a single resistor having its terminals corresponding to the terminals of the resistive element, or, for example, to a plurality of resistors in series between the terminals of the resistive element.

Figure 1:
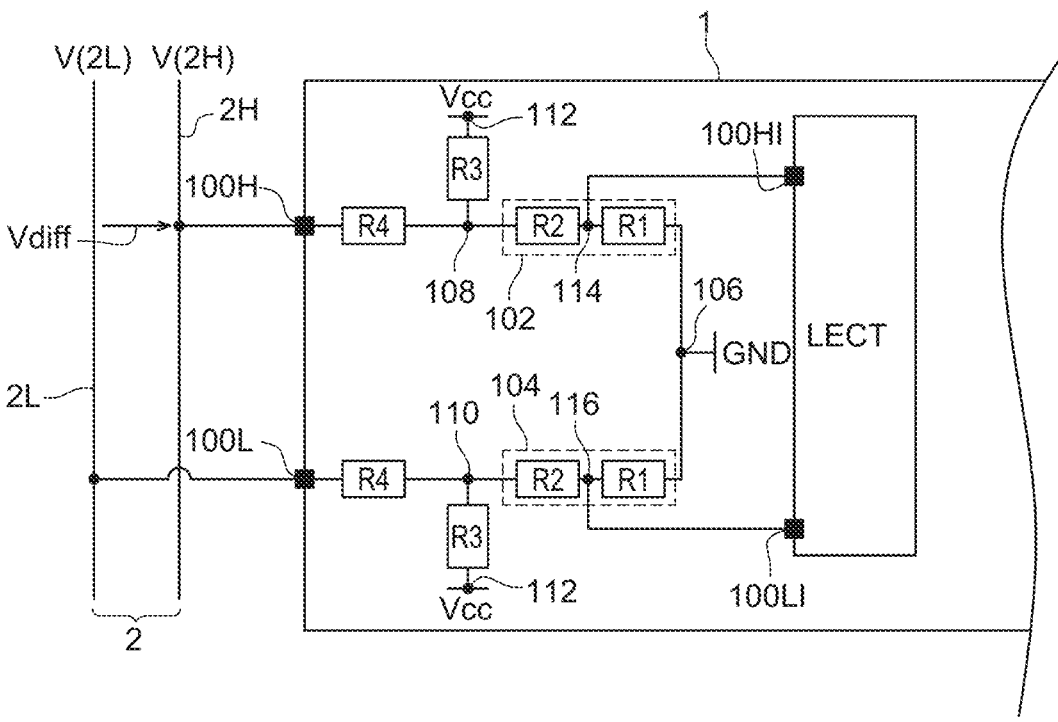
FIG. 1 shows an example of a device for reading from a differential two-wire bus.

FIG. 1 shows an example of a device 1 for reading from a two-wire bus 2, for example, of CAN type.

Bus 2 comprises two conductors, or conductive lines, 2H and 2L. The digital data over the bus are transmitted by varying a differential voltage Vdiff of bus 2, voltage Vdiff being equal to $V(2H)-V(2L)$ with $V(2H)$ the potential on conductor 2H and $V(2L)$ the potential on conductor 2L.

Device 1 comprises a terminal 100H intended to be connected to the conductor 2H of bus 2, terminal 100H being shown as being connected to conductor 2H in FIG. 1. Device 1 further comprises a terminal 100L intended to be connected to the conductor 2L of bus 2, terminal 100H being shown as being connected to conductor 2H in FIG. 1.

Device 1 comprises two identical resistive dividing bridges 102 and 104. Bridge 102 is connected between a reference node 106 and a node 108 coupled to terminal 100H. Bridge 104 is connected between node 106 and a node 110 coupled to terminal 100L.

Reference node 106 is configured to receive a reference potential GND, for example, the ground.

For example, node 108 is coupled to terminal 100H by a resistive element R4 and node 110 is coupled to terminal 100L by another resistive element R4, both elements R4 having the same resistance value. For example, one of elements R4 has one terminal connected to node 108 and another terminal connected to terminal 100H, and the other of elements R4 has one terminal connected to node 110 and another terminal connected to terminal 100L.

For example, elements R4 have the function of setting the impedance seen by conductor 2H, respectively 2L, on terminal 100H, respectively 100L.

As an example, each of elements R4 has a resistance value approximately equal to 12 kOhms when bus 2 is of CAN type.

In the example of FIG. 1, node 108 is coupled to a supply node 112 by a resistive element R3, node 110 being coupled to node 112 by another resistive element R3. The two elements R3 have a same resistance value.

Node 112 is configured to receive a power supply potential VCC. Preferably, potential VCC is positive with respect to potential GND. For example, the potential VCC referenced to potential GND has a value substantially equal, preferably equal, to 5 V.

Preferably, the resistance value of element R3 is equal to the resistance value of each of bridges 102 and 104, so that a potential on each of nodes 108 and 110 is equal to VCC/2.

Bridge 102, respectively 104, comprises a resistive element R1 connected between node 106 and an intermediate node 114, respectively 116, of bridge 102, respectively 104. For example, in bridge 102, respectively 104, resistive element R1 has a terminal connected to node 106 and another terminal connected to node 114, respectively 116. Elements R1 have a same resistance value.

Further, bridge 102, respectively 104, comprises a resistive element R2 connected between nodes 114 and 108, respectively nodes 116 and 110. For example, in bridge 102, resistive element R2 has one terminal connected to node 114 and another terminal connected to node 108, and, in bridge 104, resistive element R2 has one terminal connected to node 116 and another terminal connected to node 110. Elements R2 have a same resistance value.

In each of bridges 102 and 104, the resistance values of elements R1 and R2 are configured so that an AC voltage on node 114 of bridge 102, respectively on node 116 of bridge 104, corresponds to the AC voltage on terminal 100H, respectively 100L, divided by a factor A. In other words, the voltage on node 114, respectively 116, has an AC (Alternative Current) component which corresponds to the AC component of the voltage on terminal 100H, respectively 100L, divided by factor A. Thus, the amplitude of the AC component on node 114, respectively 116, is A times smaller than that of the AC component on terminal 100H, respectively 100L.

As an example, factor A is greater than or equal to 10, for example, greater than or equal to 20, preferably substantially equal to 20.

Further, in each of bridges 102 and 104, the resistance value of element R1 is smaller, for example, at least ten times smaller, than that of resistive element R2. As a result, a DC (Direct Current) voltage on node 114, respectively 116, that is, the DC component of the voltage on node 114, respectively 116, is closer to the voltage on node 106 than to the DC voltage on node 108, respectively 110.

For example, the resistance values of elements R1 and R2 are selected so that the DC component of the voltage on node 114, respectively 116, belongs to a range of voltage values from approximately −1 V to approximately +2 V, even when the common-mode voltage of bus 2 varies in a range from, for example, approximately −40 V to approximately +40 V.

Device 1 further comprises a reading circuit LECT. Circuit LECT comprises a terminal 100LI connected to node 116 of bridge 104, and a terminal 100HI connected to node 114 of bridge 102.

Although this is not illustrated in FIG. 1, and as will be described in further detail in an example of implementation illustrated in FIG. 2, circuit LECT can comprises two NMOS transistors 200 and 202 having their gates connected together and their sources connected to node 116 of bridge 104, two other NMOS transistors 204 and 206 having their gates connected together and their sources connected to node 114 of bridge 102, and a current source 208 connected to the drains of transistors 202 and 204, the drains of transistors 202 and 204 being connected to each other.

In this circuit LECT, the binary state of bus 2, that is, the binary state corresponding to the current value of voltage Vdiff of bus 2, is determined based on the current flowing through each of transistors 200 and 206, for example, based on a difference between these two currents. For example, for this purpose, a different bias voltage is applied to the gates of transistors 200 and 202 and to the gates of transistors 204 and 206.

Figure 2:
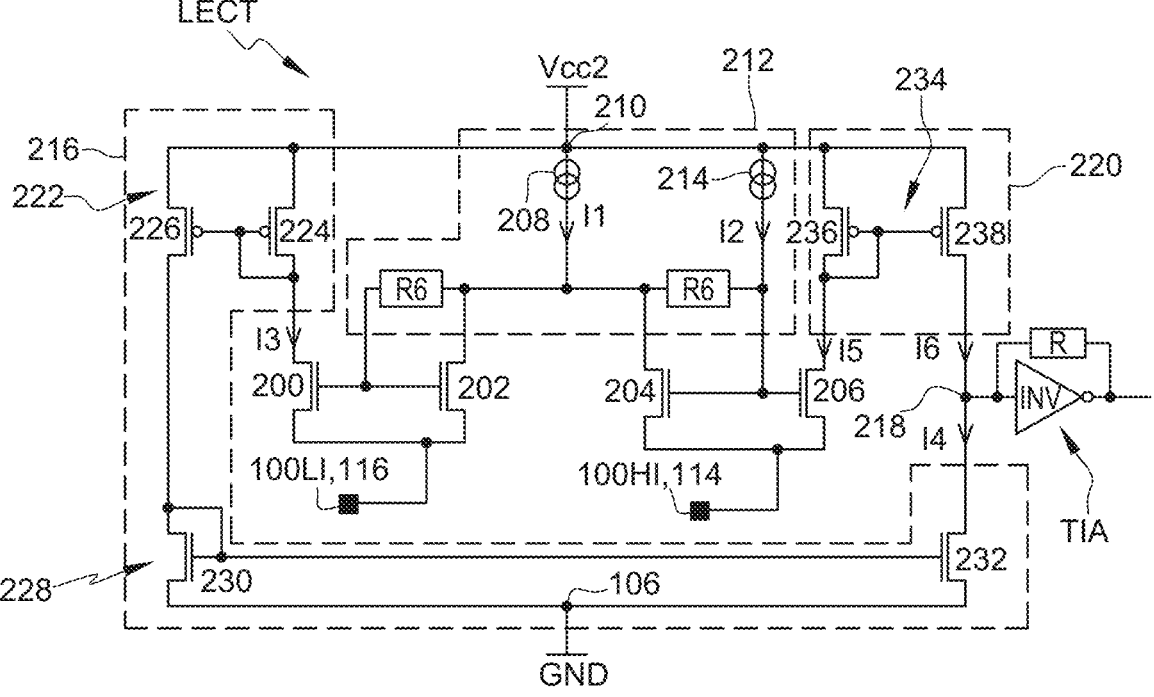
FIG. 2 shows, in more detailed fashion than in FIG. 1, an example of a circuit of the device of FIG. 1.

FIG. 2 shows, in more detailed fashion than in FIG. 1, an example of the circuit LECT of device 1.

Circuit LECT comprises, as previously indicated in relation with FIG. 1, NMOS transistors 200, 202, 204, and 206 and current source 208, these transistors and this current source being interconnected to each other and to the terminals 100LI and 100HI of circuit LECT as described in relation with FIG. 1.

In other words, transistors 200 and 202 form a first differential pair in which transistors 200 and 202 are configured, or mounted, with a common source, transistors 204 and 206 forming a second differential pair in which transistors 204 and 206 are configured, or mounted, with a common source. The first and second differential pairs are of NMOS type and are, for example, floating.

For example, current source 208 is connected between the drains of transistors 202 and 204 and a power supply node 210. Node 210 is configured to receive a power supply potential VCC2, for example, positive with respect to reference potential GND. For example, potential VCC2 is lower than potential VCC. For example, potential VCC is substantially equal, preferably equal, to 3.3 V when potential VCC is substantially equal, preferably equal, to 5 V.

Potential VCC2 forms the power supply potential of circuit LECT.

Circuit LECT comprises a bias circuit 212 configured to apply a first biasing potential to the gates of transistors 200 and 202, and a second biasing potential to the gates of the transistors.

The first and second biasing potentials are different, so that, when the two terminals 100HI and 100LI are at the same potential (zero voltage Vdiff of bus 2), the current through transistor 202 is different from that through transistor 204, the current through transistor 200 then being different from that through transistor 206.

Preferably, the first and second biasing potentials are further determined so that, when the potential on terminal 100HI is greater than the potential on terminal 100LI (positive voltage Vdiff of the bus), the inequality relationship between the currents through transistors 202 and 204 reverses with respect to the case where the potentials of terminals 100HI and 100LI are equal.

As an example, the first and second biasing potentials are configured so that, when the potentials on terminals 100HI and 100LI are equal, the current through transistor 202 is greater than the current through transistor 204, and, conversely, when the potential on terminal 100HI is greater than the potential on terminal 100LI, the current through transistor 202 is lower than the current through transistor 204. In other words, when the potentials of terminals 100HI and 100LI are equal, the current through transistor 200 is then greater than the current through transistor 206, and conversely, when the potential on terminal 100HI is greater than the potential on terminal 100LI, the current through transistor 200 is lower than the current through transistor 206.

As an alternative example, the first and second biasing potentials are configured so that, when the potentials of terminals 100HI and 100LI are equal, the current through transistor 202 is then lower than the current through transistor 204, and, conversely, when the potential on terminal 100HI is greater than the potential on terminal 100LI, the current through transistor 202 is greater than the current through transistor 204. In other words, when the potentials of terminals 100HI and 100LI are equal, the current through transistor 200 is then lower than the current through transistor 206, and, conversely, when the potential on terminal 100HI is greater than the potential on terminal 100LI, the current through transistor 200 is greater than the current through transistor 206.

Preferably, transistors 202 and 204 have identical dimensions, and further, the dimension ratio between transistors 202 and 200 is equal to the dimension ratio between transistors 204 and 206.

In the example of FIG. 2, circuit LECT is configured so that the first biasing potential is higher than the second biasing potential.

In the example of FIG. 2, biasing circuit 212 comprises current source 208, a resistive element R6 connected between the drain and the gate of transistor 202, another resistive element R6 connected between the drain and the gate of transistor 204, the two elements R6 having a same resistance value, and a current source 214 connected to the gates of transistors 204 and 206.

For example, one of elements R6 has one terminal connected to the gates of transistors 200 and 202 and another terminal connected to the interconnected drains of transistors 202 and 204, the other of elements R6 having one terminal connected to the gates of transistors 204 and 206 and another terminal connected to the interconnected drains of transistors 202 and 204.

As an example, current source 214 is connected between the gates of transistors 204 and 206, and node 210. For example, current source 214 has one terminal connected to node 210 and another terminal connected to the drains of transistors 202 and 204.

Preferably, current source 214 delivers a current I2 having a value lower, for example, at least 10 times lower, or even at least 20 times lower, than a current I1 delivered by current source 208.

As an example, current source 208 delivers a current approximately equal to 20 µA, and current source 214 delivers a current approximately equal to 0.9 µA.

Current source 214 enables, due to the current I2 that it delivers and which flows through the resistive element connected between the drain and the gate of transistor 204, to generate a difference between the potential on the gates of transistors 200 and 202 and the potential on the gates of transistors 204 and 206.

In the example of FIG. 2, in order to determine the binary state of bus 2, circuit LECT comprises a current-copying circuit 216 configured to draw, from a current summing node 218 of circuit LECT, an image I4 of a current I3 through transistor 200, and a current-copying circuit 220 configured to deliver, at node 218, an image I6 of a current I5 through transistor 206.

In the present description, there is called "current mirror circuit" a circuit configured to deliver a first current based on a second current, the first current being then called "image" of the second current and being equal to the second current to within a multiplication factor. For example, current I4 is the image of current I2 and is delivered by circuit 216.

Preferably, when transistors 202 and 204 have the same dimensions and the dimension ratio between transistors 202 and 200 is equal to the dimension ratio between transistors 204 and 206, the ratio of the value of current I6 to the value of current I5 is equal to the ratio of the value of current I4 to the value of current I3.

Circuit 216 comprises, for example, as shown in FIG. 2, a current mirror 222 with PMOS transistors and a second current mirror 228 with NMOS transistors. Current mirror 222 couples the drain of transistor 200 to current mirror 228. Current mirror 228 couples current mirror 222 to node 218.

As an example, current mirror 222 comprises a PMOS transistor 224 having its drain connected to its gate and to the drain of transistor 200, and its source connected to node 210, and a PMOS transistor 226 having its gate connected to the gate of transistor 224, its source connected to node 210, and its drain corresponding to an output of current mirror 222.

Still as an example, current mirror 228 comprises an NMOS transistor 230 having its drain connected to its gate and to the drain of transistor 226, and its source connected to node 106, and an NMOS transistor 232 having its gate connected to the gate of transistor 230, its source connected to node 106, and its drain corresponding to the output of current mirror 228, the drain of transistor 232 then delivering a current I4 which is an image of current I3.

Circuit 220 comprises, for example, as shown in FIG. 2, a current mirror 234 with PMOS transistors. Current mirror 234 couples the drain of transistor 206 to node 218.

As an example, current mirror 234 comprises a PMOS transistor 236 having its drain connected to its gate and to the drain of transistor 206, and its source connected to node 210, and a PMOS transistor 238 having its gate connected to the gate of transistor 236, its source connected to node 210, and its drain corresponding to an output of current mirror 234, the drain of transistor 238 then delivering current I6 which is an image of current I5.

Thus, the current available on node 218 is representative of the difference between currents I3 and I4, and thus of the difference between the current through transistor 202 and the current through transistor 204, and thus of the voltage value Vdiff of bus 2.

As an example, reading circuit LECT comprises a transimpedance amplifier TIA. Amplifier TIA is configured to receive a current determined by the currents through transistors 202 and 204, and to deliver, based on this received current, a binary voltage representative of the voltage Vdiff of bus 2.

For example, amplifier TIA has an input connected to node 218 and an output delivering the binary voltage representative of voltage Vdiff.

For example, amplifier TIA comprises an inverter INV and a resistive element connected between the output and the input of the inverter.

Referring again to FIG. 1, when the common mode of bus 2 decreases with respect to its nominal value, for example, equal to 2.5 V, and reaches high negative values, for example, a value of −40 V, with respect to potential VCC2 for a given example of sizing of resistive elements R1, R2, and R3, the DC component on nodes 114 and 116, which is the image of the common-mode voltage of bus 2, then becomes approximately equal to −1 V. The MOS transistors of circuits 216 and 220 are then correctly biased via the DC components of the voltages at nodes 114 and 116, so that circuit LECT is functional and robust to this decrease of the common-mode voltage with respect to its nominal value.

However, for this same given example of sizing, when the common mode voltage of bus 2 increases with respect to its nominal value and reaches high positive values, for example, a value of +40 V, with respect to potential VCC2, the DC component on nodes 114 and 116 then becomes approximately equal to 2 V. The MOS transistors of circuits 216 and 220 are then no longer correctly biased via the DC components of the voltages at nodes 114 and 116 for the circuit LECT being functional and robust to this increase in common-mode voltage with respect to its nominal value.

There is here provided a device 3 similar to device 1 which comprises a reading circuit (LECT') similar to reading circuit (LECT), which is robust, that is, which remains functional, not only to decreases of the common-mode voltage of bus 2, for example, down to values reaching −40 V, but also to increases of the common-mode voltage of bus 2, for example, up to values reaching +40 V.

Figure 3:
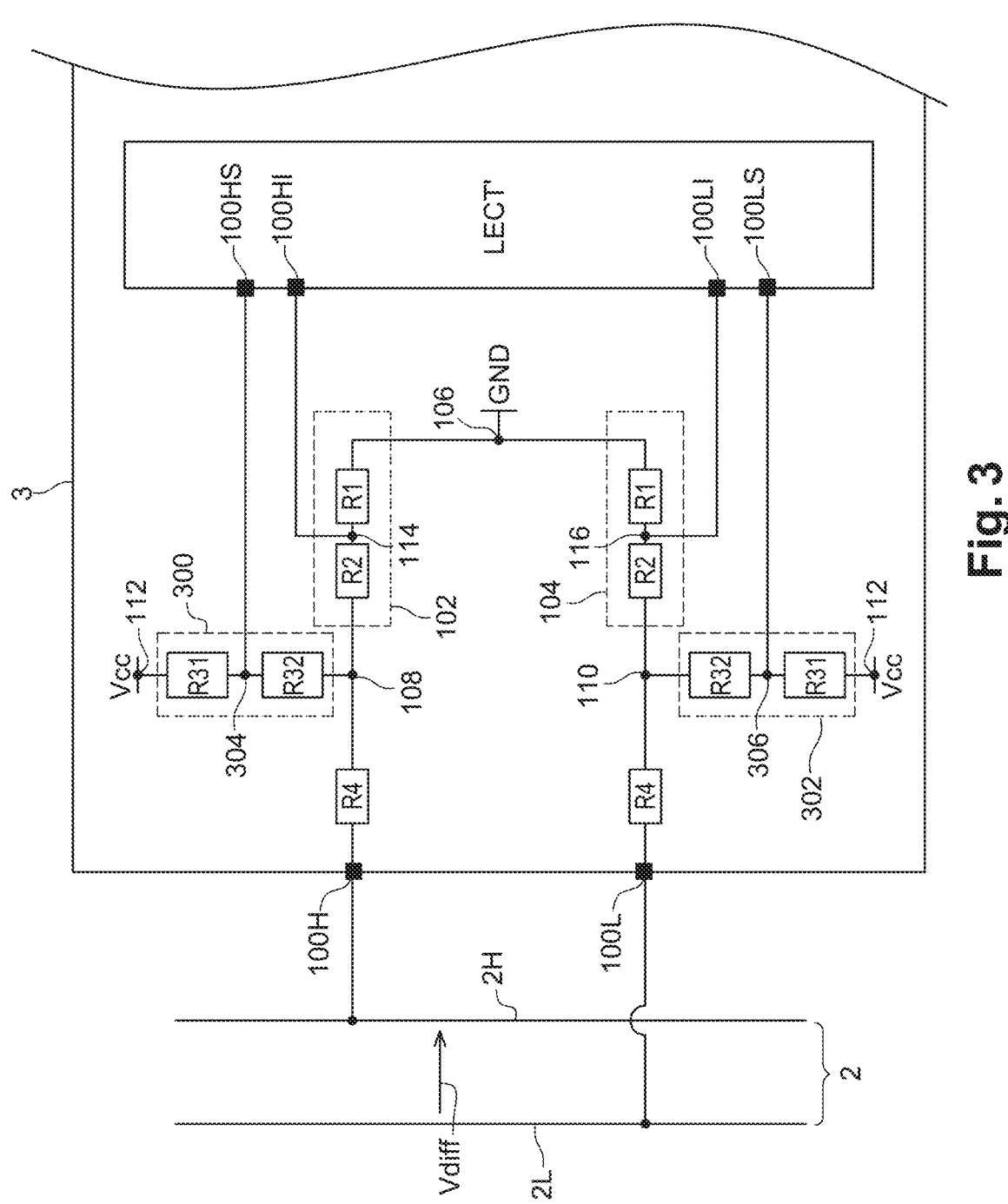
FIG. 3 shows an example of embodiment of a differential two-wire bus reading device.

FIG. 3 shows an example of embodiment of such a device 3 for reading from differential two-wire bus 2.

Device 3 comprises many elements in common with device 1, and only the differences between devices 1 and 3 are here highlighted. Thus, unless otherwise indicated, all that has been indicated or described for the device 1 of FIG. 1 applies to the device 3 of FIG. 3.

As compared with device 1, in device 3, each resistive element R3 is replaced with a voltage dividing bridge.

More particularly, the element R3 connected between nodes 108 and 112 in device 1 is replaced with a resistive dividing bridge 300 connected between nodes 108 and 112 in device 3, and the element R3 connected between nodes 110 and 112 in device 1 is replaced with a resistive dividing bridge 302 connected between nodes 110 and 112 in device 3. The two resistive bridges 300 and 302 are identical.

According to an embodiment, the resistance value of each of bridges 300 and 302 is equal to the resistance value of the resistive element R3 of device 1, or, in other words, the resistance value of each of bridges 300 and 302 is equal to the resistance value of each of bridges 102 and 104. Thus, the potential of each of nodes 108 and 110 is equal to VCC/2.

According to an embodiment, bridge 300, respectively 302, comprises a resistive element R31 connected between node 112 and an intermediate node 304, respectively 306, of bridge 300, respectively 302. For example, in bridge 300, respectively 302, resistive element R31 has one terminal connected to node 112 and another terminal connected to node 304, respectively 306. Elements R31 have the same resistance value. Further, bridge 300, respectively 302, comprises a resistive element R32 connected between nodes 304 and 108, respectively nodes 306 and 110. For example, in bridge 300, resistive element R32 has one terminal connected to node 304 and another terminal connected to node 108, and, in bridge 302, resistive element R32 has one terminal connected to node 306 and another terminal connected to node 110. Elements R32 have a same resistance value.

According to an embodiment, similarly to what has been described for bridges 102 and 104, in each of bridges 300 and 302, the resistance values of elements R31 and R32 are configured so that an AC voltage on node 304 of bridge 300, respectively on node 306 of bridge 302, corresponds to the AC voltage on terminal 100H, respectively 100L, divided by factor A. In other words, the voltage on node 304, respectively 306, has an AC component which corresponds to the AC component of the voltage on terminal 100H, respectively 100L, divided by factor A. Thus, the amplitude of the AC component on node 304, respectively 306, is A times smaller than that of the AC component on terminal 100H, respectively 100L.

According to an embodiment, in each of bridges 300 and 302, the resistance value of element R31 is smaller, for example, at least ten times smaller, than that of resistive element R32. Thus, a DC voltage on node 304, respectively 306, that is, the DC component of the voltage on node 304, respectively 306, is closer to the voltage on node 112 than to the DC voltage on node 108, respectively 110.

For example, the resistance values of elements R31 and R32 are selected so that the DC component of the voltage on node 304, respectively 306, belongs to a range of voltage values from approximately +4 V to approximately +6 V, even when the common-mode voltage of bus 2 varies within a range for example, from approximately −40 V to approximately +40 V.

According to an embodiment, the ratio of the resistance value of each element R1 to the resistance value of each element R2 is equal to the ratio of the resistance value of each element R31 to the resistance value of each element R32.

Thus, according to an embodiment, ratio R31val/(R31val+R32val) is equal to ratio R1val/(R1val+R2val) with R31val the resistance value of element R31, R32val the resistance value of element R32, R1val the resistance value of element R1, and R2val the resistance value of element R2.

As compared with device 1, as indicated above, circuit LECT is replaced with a circuit LECT' in device 3.

Circuit LECT' comprises, like circuit LECT, terminal 100LI connected to node 116 of bridge 104, and terminal 100HI connected to node 114 of bridge 102. Further, conversely to circuit LECT, circuit LECT' comprises a terminal 100HS connected to node 304 of bridge 300, and a terminal 100LS connected to node 306 of bridge 302.

Although this is not illustrated in FIG. 3, and as will be described in further detail with an example of implementation shown in FIG. 4, circuit LECT comprises the two NMOS transistors 200 and 202 having their gates connected together and their sources connected to node 116 of bridge 104, and thus to terminal 100LI of circuit LECT, the two other NMOS transistors 204 and 206 having their gates connected together and their sources connected to node 114 of bridge 102, and thus to terminal 100HI of circuit LECT', current source 208 connected to the drains of transistors 202 and 204, the drains of transistors 202 and 204 being connected to each other, two PMOS transistors 308 and 310 having their gates connected to each other and their sources connected to the intermediate node 306 of bridge 302, and thus to terminal 100LS of circuit LECT', two PMOS transistors 312 and 314 having their gates connected to each other and their sources connected to the corresponding intermediate node 304 of bridge 300, and thus to terminal 100HS of circuit LECT', and a current source 316 connected to the drains of transistors 310 and 312, the drains of transistors 310 and 312 being connected to each other.

In this circuit LECT, the binary state of bus 2 is determined not only based on the current flowing through each of transistors 200 and 206, but also based on the current flowing through each of transistors 310 and 312.

For example, for this purpose, as in circuit LECT, the biasing potential applied to the gates of transistors 200 and 202 is different from the biasing potential applied to the gates of transistors 204 and 206, and, further, a biasing potential applied to the gates of transistors 308 and 310 is different from a biasing potential applied to the gates of transistors 312 and 314.

Preferably, when the biasing potential applied to the gates of transistors 200 and 202 is higher, respectively lower, than the biasing potential applied to the gates of transistors 204 and 206, the biasing potential applied to the gates of transistors 308 and 310 is higher, respectively lower, than the biasing potential applied to the gates of transistors 312 and 314.

Thus, when the common-mode voltage of bus 2 decreases with respect to its nominal value, for example, down to values ranging down to −40 V, the correct operation of circuit LECT' remains ensured via transistors 200, 202, 204, and 206, and, when the common-mode voltage of bus 2 increases with respect to its nominal value, for example, up to values ranging up to +40 V, the correct operation of circuit LECT remains ensured via transistors 308, 310, 312, and 314.

In other words, when the common-mode voltage of bus 2 decreases with respect to its nominal value, for example, down to values ranging down to −40 V, the correct operation of circuit LECT remains ensured via the DC components of the voltages of nodes 114 and 116, and, when the common-mode voltage of bus 2 increases with respect to its nominal value, for example, up to values ranging up to +40 V, the correct operation of circuit LECT remains ensured via the DC components of the voltages of nodes 304 and 306.

Figure 4:
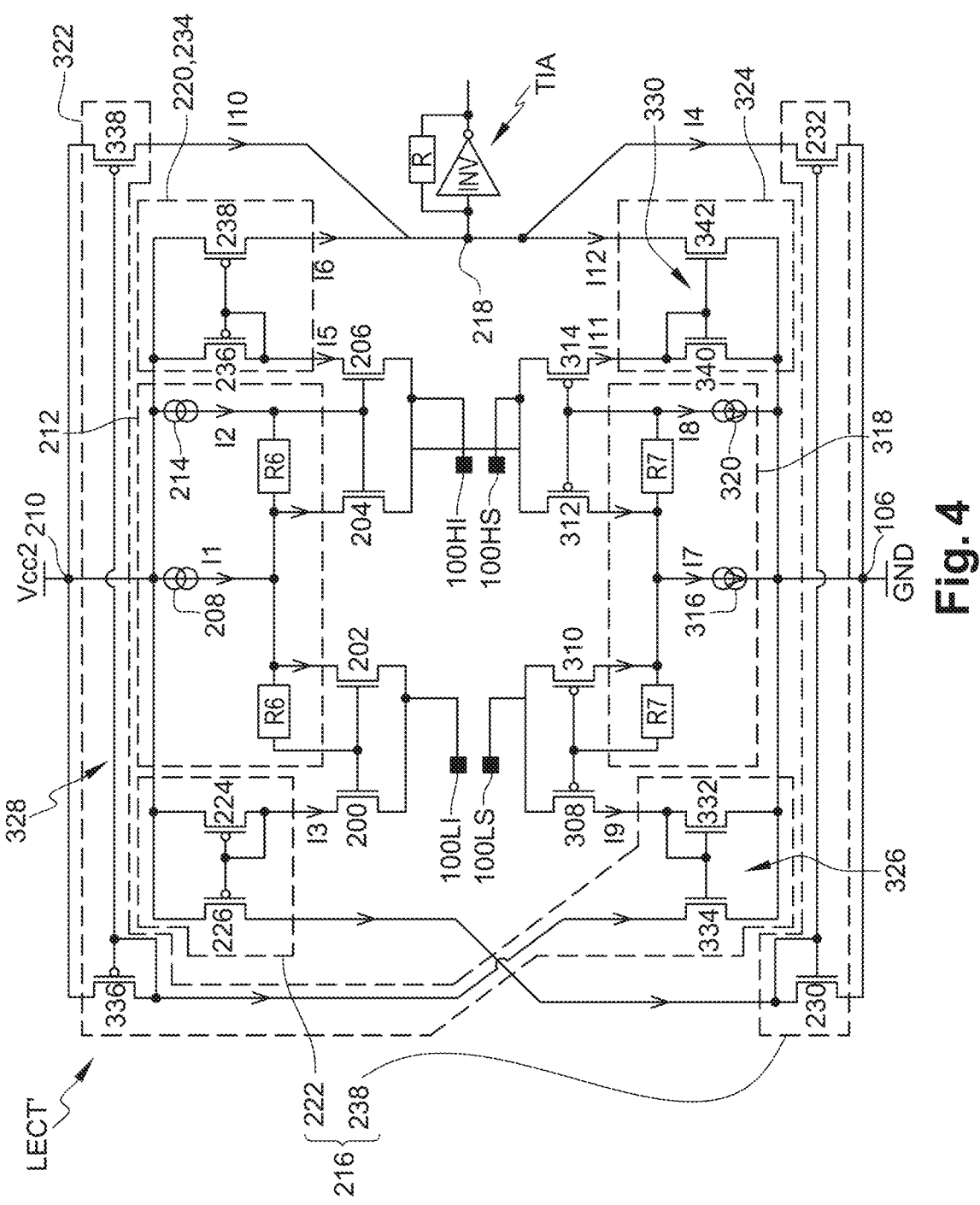
FIG. 4 shows, in more detailed fashion than in FIG. 3, an example of embodiment of a circuit of the device of FIG. 3.

FIG. 4 shows, in more detailed fashion than in FIG. 3, an example of embodiment of the circuit LECT of device 3.

The circuit LECT of FIG. 4 comprises many elements in common with the circuit LECT of FIG. 2, and only the differences between these circuits LECT and LECT' are here highlighted. Thus, unless otherwise indicated, all that has been indicated or described for circuit LECT applies to circuit LECT.

Circuit LECT' comprises, as previously indicated in relation with FIG. 3, NMOS transistors 200, 202, 204, and 206 and current source 208, as well as PMOS transistors 308, 310, 312, 314 and current source 316, these transistors and current sources being interconnected together and to the terminals 100LI, 100HI, 100LS, and 100HS of circuit LECT as described in relation with FIG. 3.

In other words, transistors 200 and 202 form a first differential pair in which transistors 200 and 202 are configured, or mounted, with a common source, transistors 204 and 206 form a second differential pair in which transistors 204 and 206 are configured, or mounted, with a common source, and transistors 308 and 310 form a third differential pair in which transistors 310 and 308 are configured, or mounted, with a common source, and transistors 312 and 314 form a fourth differential pair in which transistors 312 and 314 are configured, or mounted, with a common source. The first and second differential pairs are of NMOS type, the third and fourth differential pairs being of PMOS type. The four differential pairs are, for example, to be floating.

For example, current source 208 is connected between the drains of transistors 202 and 204 and the power supply node 210 configured to receive power supply potential VCC2.

For example, current source 316 is connected between the drains of transistors 310 and 312 and reference node 106.

Potential VCC2 forms the power supply potential of circuit LECT.

According to an embodiment, circuit LECT comprises biasing circuit 212 configured to apply the first and second different bias potentials to the gates of transistors 200 and 202 and to the gates of transistors 204 and 206. Further, circuit LECT includes a biasing circuit 318. Circuit 318 is configured to apply a third biasing potential to the gates of transistors 308 and 310, and a fourth biasing potential to the gates of transistors 312 and 314.

The third and fourth biasing potentials are different so that, when the two terminals 100HS and 100LS are at the same potential (zero voltage Vdiff of bus 2), the current through transistor 310 is different from that through transistor 312, while the current through transistor 308 is different from that through transistor 314.

Preferably, the third and fourth biasing potentials are further determined so that, when the potential at terminal 100HS is greater than the potential at terminal 100LS (positive voltage Vdiff of the bus), the inequality relationship between the currents through transistors 310 and 312 is reversed with respect to the case where the potentials of terminals 100HS and 100LS are equal.

As an example, the third and fourth biasing potentials are configured so that, when the potentials of terminals 100HS and 100LS are equal, the current through transistor 310 is then greater than the current through transistor 312, and, conversely, when the potential on terminal 100HS is greater than the potential on terminal 100LS, the current through transistor 310 is lower than the current through transistor 312. In other words, when the potentials of terminals 100HS and 100LS are equal, the current through transistor 308 is greater than the current through transistor 314, and, conversely, when the potential on terminal 100HS is greater than the potential on terminal 100LS, the current through transistor 308 is lower than the current through transistor 314.

As an alternative example, the third and fourth biasing potentials are configured so that, when the potentials on terminals 100HS and 100LS are equal, the current through transistor 310 is then lower than the current through transistor 312, and, conversely, when the potential on terminal 100HS is greater than the potential on terminal 100LS, the current through transistor 310 is greater than the current through transistor 312. In other words, when the potentials of terminals 100HS and 100LS are equal, the current through transistor 308 is then lower than the current through transistor 314, and, conversely, when the potential on terminal 100HS is greater than the potential on terminal 100LS, the current through transistor 308 is greater than the current through transistor 314.

Preferably, transistors 308 and 310 have identical dimensions, and further, the dimension ratio between transistors 308 and 310 is equal to the dimension ratio between transistors 312 and 314.

In the example of FIG. 4, circuit LECT is configured so that the first biasing potential applied to the gates of transistors 200 and 202 is higher than the second biasing potential applied to the gates of transistors 204 and 206, and, further, so that the third biasing potential applied to the gates of transistors 308 and 310 is higher than the fourth potential applied to the gates of transistors 312 and 314.

According to an embodiment, circuit 212 comprises current source 208, the two resistive elements R6, and current source 214 connected together as described in relation with FIG. 2, and, further, circuit 318 comprises current source 316, a resistive element R7 connected between the drain and the gate of transistor 310, another resistive element R7 connected between the drain and the gate of transistor 312, the two elements R7 having the same resistance value, and a current source 320 connected to the gates of transistors 312 and 314.

For example, one of elements R7 has one terminal connected to the gates of transistors 308 and 310 and another terminal connected to the interconnected drains of transistors 310 and 312, the other of elements R7 having one terminal connected to the gates of transistors 312 and 314 and another terminal connected to the interconnected drains of transistors 310 and 312.

As an example, current source 320 is connected between the gates of transistors 312 and 314, and node 106. For example, current source 320 has one terminal connected to node 106 and another terminal connected to the drains of transistors 312 and 314.

Preferably, current source 320 delivers a current I8 having a value lower, for example, at least 10 times lower, or even at least 20 times lower, than a current I7 delivered by current source 316.

As an example, current source 316 delivers a current I7 approximately equal to 20 µA, and current source 320 delivers a current I8 approximately equal to 0.9 µA.

For example, source 316 delivers a current I7 equal to the current I1 delivered by source 208, and source 320 delivers a current I8 equal to the current I2 delivered by current source 214.

Current source 320 enables, due to the current I8 that it delivers and which flows through the resistive element R7 connected between the drain and the gate of transistor 312, to generate a difference between the potential on the gates of transistors 308 and 310 and the potential on the gates of transistors 312 and 314.

According to an embodiment, in order to determine the binary state of bus 2, circuit LECT comprises the current-copying circuit 216, the current-copying circuit 220, a current-copying circuit 322 configured to provide to node 218 an image I10 of a current I9 through transistor 308, and a current-copying circuit 324 configured to draw, from node 218, an image I12 of a current I11 through transistor 314.

Preferably, when transistors 310 and 312 have the same dimensions and the dimension ratio between transistors 308 and 310 is equal to the dimension ratio between transistors 312 and 314, the ratio of the value of current I10 to the value of current I9 is equal to the ratio of the value of current I12 to the value of current I11.

According to an embodiment, circuit 216 comprises current mirrors 222 and 328, circuit 220 comprises current mirror 234, circuit 322 comprises a current mirror 326 with NMOS transistors and a current mirror 328 with PMOS transistors, and circuit 324 comprises a current mirror 330 with NMOS transistors.

Current mirror 326 couples the drain of transistor 308 to current mirror 328, current mirror 328 coupling current mirror 326 to node 218. Further, current mirror 330 couples the drain of transistor 314 to node 218.

As an example, current mirror 326 comprises an NMOS transistor 332 having its drain connected to its gate and to the drain of transistor 308, and its source connected to node 106, and an NMOS transistor 334 having its gate connected to the gate of transistor 332, its source connected to node 106, and its drain corresponding to an output of current mirror 326. Current mirror 328 comprises a PMOS transistor 336 having its drain connected to its gate and to the drain of transistor 334, and its source connected to node 210, and a PMOS transistor 338 having its gate connected to the gate of transistor 336, its source connected to node 210, and its drain corresponding to the output of current mirror 322, the drain of transistor 338 then delivering current I10, which is an image of current I9.

As an example, current mirror 330 comprises an NMOS transistor 340 having its drain connected to its gate and to the drain of transistor 314, and its source connected to node 106, and an NMOS transistor 342 having its gate connected to the gate of transistor 340, its source connected to node 106, and its drain corresponding to an output of current mirror 330, the drain of transistor 342 then delivering current I12, which is an image of current I11.

Thus, the current available on node 218 is representative not only of the difference between currents I3 and I4, and thus of the difference between the current through transistor 202 and the current through transistor 204, but also of the difference between currents I9 and I11, and thus of the difference between the current through transistor 310 and the current through transistor 312.

As a result, when the common-mode voltage of bus 2 increases up to values for which circuits 216 and 220, and in particular their respective current mirrors 222 and 234, are no longer functional, circuits 322 and 324 remain functional and the total current available on node 218 remains determined by the difference between currents I10 and I12, which is representative of the value of the voltage Vdiff of bus 2.

Conversely, when the common-mode voltage of bus 2 decreases down to values for which circuits 320 and 322, and in particular their respective current mirrors 326 and 330, are no longer functional, circuits 216 and 220 remain functional and the total current available on node 218 remains determined by the difference between currents I4 and I6, which is representative of the value of the voltage Vdiff of bus 2.

According to an embodiment, reading circuit LECT' comprises transimpedance amplifier TIA. Amplifier TIA is configured to receive a current determined by the currents through transistors 202, 204, 310, and 312 and to deliver, based on this received current, a binary voltage representative of the voltage Vdiff of bus 2.

According to an embodiment, amplifier TIA has an input connected to node 218 and an output delivering the binary voltage representative of voltage Vdiff.

According to an embodiment, amplifier TIA comprises an inverter INV and a resistive element connected between the output and the input of the inverter.

Examples of embodiments have been described above in relation with FIGS. 3 and 4.

In particular, examples of dimension ratios between the various transistors have been given, but the present application is not limited to these specific examples and those skilled in the art will be capable of modifying these dimension ratios between transistors while keeping the operation described for device 3.

Further, specific examples of values of potentials VCC and VCC2 have been given, in connection with specific examples of negative and positive values of the common-mode voltage of bus 2, to illustrate the operation of device 3 and of the circuits forming it. Here again, the present application is not limited to these specific examples and those skilled in the art will be capable of applying the present description to other examples of values of potentials VCC and VCC2 and of ranges of values for the variations of the common-mode voltage of bus 2.

Further, those skilled in the art will be capable of providing other implementations of amplifier TIA and/or of biasing circuits 212 and 318 and/or of the various current copying circuits while keeping the operation described hereinabove for device 3. For example, amplifier TIA may be implemented with an operational amplifier assembly having an inverting input—coupled to node 218 and a resistive element R connected between the inverting input—and the output of the operational amplifier, the non-inverting input receiving, for example, a voltage capable of biasing node 218 to a potential VCC2/2 like the inverter INV of the previously-described amplifier TIA.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereinabove. In particular, those skilled in the art will be capable, based on the functional description made above, of sizing the resistance values of resistive elements R1, R2, R31, R32 and, if present, of resistive elements R5, to obtain the above-described operation. Those skilled in the art will also be capable, when biasing circuits 212 and 318 are implemented with current sources 208, 214, 316, and 320, of sizing these current sources to obtain the described operation.

What is claimed is:

1. A device comprising:
first and second terminals configured to be respectively connected to first and second conductors of a differential two-wire bus;
first and second identical resistive dividing bridges connected between a reference node and respectively first and second nodes, wherein the first and second nodes are respectively coupled with the first and second terminals;
third and fourth identical resistive dividing bridges connected between a supply node and respectively the first and second nodes; and
a reading circuit comprising:
first and second NMOS (n-channel metal oxide semiconductor) transistors having gates connected to each other and sources connected to an intermediary node of the second bridge;
third and fourth NMOS transistors having gates connected to each other and sources connected to a corresponding intermediary node of the first bridge;
fifth and sixth PMOS (p-channel metal oxide semiconductor) transistors having gates connected to each other and sources connected to an intermediary node of the fourth bridge;
seventh and eighth transistors having gates connected to each other and sources connected to a corresponding intermediary node of the third bridge;
wherein the second and third transistors have drains connected to a first current source;
wherein the sixth and seventh transistors have drains connected to a second current source; and
wherein the reading circuit is configured to determine a binary state of the bus from currents flowing through the first, fourth, fifth, and eighth transistors.

2. The device of claim 1, wherein:
the reference node is configured to receive a reference potential; and
the supply node is configured to receive a supply potential.

3. The device of claim 2, wherein the supply potential is preferably positive with respect to the reference potential.

4. The device of claim 1, wherein:
each of the first and second bridges comprises:
a first resistive element connected between the reference node and the intermediary node of the bridge; and
a second resistive element connected between the intermediary node of the bridge and, respectively, the first node and the second node; and
each of the third and fourth bridges comprises:
a third resistive element connected between the supply node and the intermediary node of the bridge; and
a fourth resistive element connected between the intermediary node of the bridge and, respectively, the first node and the second node.

5. The device of claim 4, wherein a ratio of resistance value of the first resistive element to the resistance value of the second resistive element is equal to a ratio of resistance value of the third resistive element to the resistance value of the fourth resistive element.

6. The device of claim 4, wherein:
in each of the first and second bridges, the first and second resistive elements are configured so that:
an AC voltage on the intermediary node of the first bridge corresponds to an AC voltage on the first terminal divided by a factor A, and
an AC voltage on the intermediary node of the second bridge corresponds to an AC voltage on the second terminal divided by the factor A;
in each of the third and fourth bridges, the third and fourth resistive elements are configured so that:
an AC voltage on the intermediary node of the third bridge corresponds to an AC voltage on the first terminal divided by the factor A, and
an AC voltage on the intermediary node of the fourth bridge corresponds to an AC voltage on the second terminal divided by the factor A.

7. The device of claim 4, wherein:
in each of the first and second bridges, a resistance value of the first resistive element is lower than a resistance value of the second resistive element; and
in each of the third and fourth bridges, a resistance value of the third resistive element is lower than a resistance value of the fourth resistive element.

8. The device of claim 1, wherein:
a fifth resistive element couples the first node with the first terminal; and
a sixth resistive element identical to the fifth resistive element couples the second node with the second terminal.

9. The device of claim 1, wherein the reading circuit comprises:
a first biasing circuit configured to:
apply a first biasing potential to the gates of the first and second transistors, and
apply a second biasing potential to the gates of the third and fourth transistors, wherein the second potential is different from the first potential; and
a second biasing circuit configured to:
apply a third biasing potential to the gates of the fifth and sixth transistors, and apply a fourth biasing potential to the gates of the seventh and eighth transistors, wherein the fourth potential is different from the third potential.

10. The device of claim 9, wherein:

the first biasing circuit comprises:

the first current source, a seventh resistive element connected between the drain and the gate of the second transistor, an eighth resistive element having a same resistance value as the seventh resistive element, connected between the drain and the gate of the third transistor, and a third current source connected to the gates of the third and fourth transistors; and the second biasing circuit comprises:

the second current source, a ninth resistive element connected between the drain and the gate of the sixth transistor, a tenth resistive element having a same resistance value as the ninth resistive element, connected between the drain and the gate of the seventh transistor, and a fourth current source connected to the gates of the seventh and eighth transistors.

11. The device of claim 1, wherein the reading circuit comprises:

a first circuit for copying current configured to draw, at a node for summing a current of the reading circuit, an image of a current through the first transistor;

a second circuit for copying current configured to deliver, at the node for summing the current, an image of a current through the fourth transistor;

a third circuit for copying current configured to deliver, at the node for summing the current, an image of a current through the fifth transistor; and a fourth circuit for copying current configured to draw, at the node for summing the current, an image of a current through the eighth transistor.

12. The device of claim 11, wherein:

the first circuit for copying current comprises:

a first current mirror with PMOS transistors, and a second current mirror with NMOS transistors, wherein the first current mirror couples the drain of the first transistor with the second current mirror, and the second current mirror couples the first mirror with the node for summing;

the second circuit for copying current comprises a third current mirror with PMOS transistors coupling the drain of the fourth transistor with the node for summing;

the third circuit for copying current comprises:

a fourth current mirror with NMOS transistors, and a fifth current mirror with PMOS transistors, wherein the fourth current mirror couples the drain of the fifth transistor with the fifth current mirror, and the fifth current mirror couples the fourth current mirror with the node for summing; and the fourth circuit for copying current comprises sixth current mirror with NMOS transistors, coupling the drain of the eighth transistor with the node for summing.

13. The device of claim 1, wherein the reading circuit comprises a transimpedance amplifier configured to:

receive a current determined by the currents flowing through the first, fourth, fifth and eighth transistors, and deliver, from the received current, a binary voltage representative of a differential voltage of the bus.

14. The device of claim 12, wherein the reading circuit comprises a transimpedance amplifier having an input coupled with the node for summing and an output configured to deliver, from a current received at its input, a binary voltage representative of a differential voltage of the bus.

15. The device of claim 13, wherein the transimpedance amplifier comprises:

an inverter, and a resistive element connected between an input of the inverter and an output of the inverter.

16. A reading circuit for a differential two-wire bus device, the reading circuit comprising:

a first differential pair of NMOS (n-channel metal oxide semiconductor) transistors having sources connected to a first intermediary node of a first resistive dividing bridge;

a second differential pair of NMOS transistors having sources connected to a second intermediary node of a second resistive dividing bridge;

a third differential pair of PMOS (p-channel metal oxide semiconductor) transistors having sources connected to a third intermediary node of a third resistive dividing bridge;

a fourth differential pair of PMOS transistors having sources connected to a fourth intermediary node of a fourth resistive dividing bridge;

a first current source connected to drains of one transistor from the first differential pair and one transistor from the second differential pair;

a second current source connected to drains of one transistor from the third differential pair and one transistor from the fourth differential pair;

a first biasing circuit configured to apply different biasing potentials to gates of the first and second differential pairs;

a second biasing circuit configured to apply different biasing potentials to gates of the third and fourth differential pairs; and a current summing node, wherein the reading circuit is configured to determine a binary state of the bus based on currents flowing through one transistor from each of the four differential pairs to the current summing node.

17. The reading circuit of claim 16, further comprising:

a first current copying circuit configured to draw, at the current summing node, an image of a current through a first transistor of the first differential pair;

a second current copying circuit configured to deliver, at the current summing node, an image of a current through a second transistor of the second differential pair;

a third current copying circuit configured to deliver, at the current summing node, an image of a current through a first transistor of the third differential pair; and a fourth current copying circuit configured to draw, at the current summing node, an image of a current through a second transistor of the fourth differential pair.

18. The reading circuit of claim 17, further comprising a transimpedance amplifier having an input coupled to the current summing node and an output configured to deliver a binary voltage representative of a differential voltage of the bus, wherein the transimpedance amplifier comprises an inverter and a resistive element connected between an input of the inverter and an output of the inverter.

19. A device for reading from a differential two-wire bus, comprising:

a first terminal and a second terminal configured to be respectively connected to first and second conductors of the differential two-wire bus;

a first resistive dividing bridge connected between a reference node and a first node, wherein the first node is coupled to the first terminal;

a second resistive dividing bridge connected between the reference node and a second node, wherein the second node is coupled to the second terminal;

a third resistive dividing bridge connected between a supply node and the first node;

a fourth resistive dividing bridge connected between the supply node and the second node; and a reading circuit comprising:

a first differential pair of NMOS (n-channel metal oxide semiconductor) transistors having sources connected to an intermediary node of the second resistive dividing bridge;

a second differential pair of NMOS transistors having sources connected to an intermediary node of the first resistive dividing bridge;

a third differential pair of PMOS (p-channel metal oxide semiconductor) transistors having sources connected to an intermediary node of the fourth resistive dividing bridge;

a fourth differential pair of PMOS transistors having sources connected to an intermediary node of the third resistive dividing bridge;

a first biasing circuit configured to apply different biasing potentials to gates of the first and second differential pairs; and a second biasing circuit configured to apply different biasing potentials to gates of the third and fourth differential pairs;

wherein the reading circuit is configured to determine a binary state of the bus based on currents flowing through the first, second, third, and fourth differential pairs.

20. The device of claim 19, wherein the first biasing circuit is configured to apply a first biasing potential to the gates of the first and second differential pairs that is higher than a second biasing potential applied to the gates of the third and fourth differential pairs, such that when a common-mode voltage of the bus decreases below a nominal value, the first and second differential pairs remain operational while the third and fourth differential pairs become non-operational, and when the common-mode voltage increases above the nominal value, the third and fourth differential pairs remain operational while the first and second differential pairs become non-operational.

* * * * *